US00RE49523E

(19) United States
(12) Reissued Patent
Tyagi et al.

(10) Patent Number: US RE49,523 E
(45) Date of Reissued Patent: May 9, 2023

(54) INTEGRAL POLYETHYLENE TEREPHTHALATE GRIDS, THE METHOD OF MANUFACTURE, AND USES THEREOF

(71) Applicant: TENSAR CORPORATION, Atlanta, GA (US)

(72) Inventors: Manoj Kumar Tyagi, Fayetteville, GA (US); William Stanley Shelton, Lithonia, GA (US)

(73) Assignee: TENSAR CORPORATION, LLC, Alpharetta, GA (US)

(21) Appl. No.: 15/880,932

(22) Filed: Jan. 26, 2018

Related U.S. Patent Documents

Reissue of:
(64) Patent No.: 9,249,552
Issued: Feb. 2, 2016
Appl. No.: 12/449,379
PCT Filed: Feb. 5, 2008
PCT No.: PCT/US2008/001481
§ 371 (c)(1),
(2) Date: May 3, 2010
PCT Pub. No.: WO2008/097523
PCT Pub. Date: Aug. 14, 2008

U.S. Applications:
(60) Provisional application No. 60/899,658, filed on Feb. 6, 2007.

(51) Int. Cl.
*B29C 55/02* (2006.01)
*E02D 17/20* (2006.01)
(Continued)

(52) U.S. Cl.
CPC ..... *E02D 17/00* (2013.01); *B29C 55/04* (2013.01); *B29C 55/12* (2013.01); *B29D 28/00* (2013.01);
(Continued)

(58) Field of Classification Search
CPC ..... Y10T 428/249921; B29K 2067/003
See application file for complete search history.

(56) References Cited

U.S. PATENT DOCUMENTS

| | | | |
|---|---|---|---|
| 4,374,798 | A | 2/1983 | Mercer |
| 4,590,029 | A | 5/1986 | Mercer |

(Continued)

FOREIGN PATENT DOCUMENTS

| | | |
|---|---|---|
| DE | 698 17 607 | 6/2004 |
| GB | 2 266 540 | 11/1993 |
| WO | WO 99/28563 | 6/1999 |

OTHER PUBLICATIONS

Ward, I.M., "Mechanical Properties of Solid Polymers," Wiley Interscience, New York, 1971.

*Primary Examiner* — Timothy J. Kugel
(74) *Attorney, Agent, or Firm* — Jacobson Holman PLLC

(57) ABSTRACT

An integral polymer grid with a plurality of interconnected, oriented polyethylene terephthalate strands and an array of openings therein is made from a polyethylene terephthalate sheet-like starting material having holes or depressions therein that form the openings when the sheet-like material is uniaxially or biaxially stretched. The grid has a higher tensile strength to weight ratio and a higher creep reduced strength to weight ratio than corresponding ratios associated with a grid made from a non-polyethylene terephthalate starting material.

36 Claims, 15 Drawing Sheets

(51) Int. Cl.

| | |
|---|---|
| ***E02D 17/00*** | (2006.01) |
| ***B29C 55/04*** | (2006.01) |
| ***B29C 55/12*** | (2006.01) |
| ***B29D 28/00*** | (2006.01) |
| ***E02D 31/00*** | (2006.01) |
| *B29K 67/00* | (2006.01) |

(52) U.S. Cl.
CPC ..... *E02D 17/202* (2013.01); *E02D 31/004* (2013.01); *B29K 2067/003* (2013.01); *Y10T 428/24273* (2015.01); *Y10T 428/249921* (2015.04)

(56) References Cited

U.S. PATENT DOCUMENTS

| | | | | |
|---|---|---|---|---|
| 4,743,486 | A | 5/1988 | Mercer et al. | |
| 4,756,946 | A | 7/1988 | Mercer | |
| 4,837,387 | A * | 6/1989 | van de Pol | 442/185 |
| 5,419,659 | A | 5/1995 | Mercer | B65D 71/504 405/302.7 |
| 6,312,198 | B1 | 11/2001 | Van Vliet et al. | |
| 6,572,718 | B2 | 6/2003 | Heerten et al. | B29C 66/526 156/73.6 |
| 2005/0112372 | A1 * | 5/2005 | Rolland et al. | C08J 5/18 428/364 |
| 2007/0003710 | A1 | 1/2007 | Lynch et al. | |

* cited by examiner

CPET 3mm#1, 60% Loading

CPET 3mm#2, 70% Loading

Comparative creep curves under 40% of ultimate load for (1) nonwoven needled polypropylene fabric; (2) woven polypropylene fabric; (3) nonwoven needled fabric; (4) nonwoven thermal bonded polypropylene fabric.

Creep curves for (1) polypropylene, (2) polyamide, (3) polyester filaments.

FIG. 6

Table 1

Test Results

| Variant | Pk load Newtons (N) | Test Specimen X-sectional area ($mm^2$) | Specific Tensile Strength (N/mm2) | Comments |
|---|---|---|---|---|
| HDPEUS21-2 | 1329 | 58.56 | 22.31 | HDPE unstretched, 21mm wide, 1.84mm tick |
| HDPEUS21-1 | 1311 | 57.4 | 22.8 | same as above. |
| HDPEUS-2 | 2457 | 101.1 | 24.3 | HDPE unstretched, 38.5mm wide, 1.84mm tick |
| HDPESC-1 | 1417 | 9.277 | 152.74 | 38.5mm strip stretched 4:1, heat set |
| HDPES247-1 | 1154 | 7.06 | 163.4 | 3/8"-5/8" diablo punch, 4:1 stretch |
| HDPES20-1 | 1229 | 11.29 | 108.8 | 20mm strip stretched 4:1 |
| HDPES-1 | 2175 | 20.59 | 105.6 | 38.5mm strip (2.8mm thick) stretched 4:1 |
| APETUS385 | 4602 | 70.84 | 64.98 | unstretched 38.5mm wide sample |
| APETUS21-1 | 2409 | 39.28 | 61.33 | unstretched 21mm wide sample |
| APETS385-3 | 1188 | 15.47 | 76.8 | 38.5mm wide stretched 5.5:1 |
| APETS247-2 | 635 | 7.31 | 73.18 | 3/8"-5/8" diablo punch, stretched 4:1, sample from TD rib (SR 4.5:1) |
| APETS247-1 | 688 | 12.59 | 54.48 | 3/8"-5/8" diablo punch, stretched 4:1, sample from punched rib (SR 2.25:1) |
| APETS20-1 | 482 | 8.84 | 54.52 | 10:1draw from 70.84$mm^2$ X-section |
| APETS10-to-1-1 | 176 | 3.125 | 56.32 | 5:1draw length 158mm between drawn ribs along md. Circle punched |
| APETCS-R-1 | 432 | 6.58 | 65.8 | 5:1draw Rib portion of circle punched structure. Rib length 46mm |
| APETCS-C-1 | 401 | 7.33 | 54.7 | 6:1draw Rib length121mm. Circle punched |
| APETS20-C1 | 2436 | 13.45 | 181.8 | 5.68:1 draw blushed white due to being orientated such that it become crystallized temp. 60degrees centigrade |
| APETS20-C2 | 2419 | 13.89 | 174.1 | same as above. |
| CPETUS | 21789 | 276.8 | 78.7 | CPET (1/4 inch thick crystalline PET from modern plastics), dogbone shape sample |
| CPETS | 8091 | 42.8 | 189 | CPET punched with 3/8"x5/8" diablo punch, stretched at 153 C, 15 min soak, ratio 2.35:1 |
| CPETS2 | 19198 | 75.47 | 254.4 | CPET, dogbone, 3.56:1 draw 95degrees centigrade at 8min. |
| PETGUS-1 | 12516 | 245.65 | 50.95 | dogbone shape sample |
| PETGS-1 | 1608 | 20.62 | 77.8 | 6.56:1draw using 3/8X5/8 diablo punch. Ribs tested,aperture avg=136.mm |
| CPETS3-205-1 | 8,503 | 26.22 | 197 | 4:1 First specimen pulled out of grips, did not brk. Second specimen eventually slipped but after the clamping force had been increased to the maximum system psig. Also after reaching the 8503 newton load. |
| CPETS3-20-1 | 4013 | 24.68 | 162.6 | 3.5:1 |
| CPETS3-205-2 | 8483 | 29.42 | 288 | 4.0:1 |
| CPETS3-205-3 | 8693 | 24.55 | 354 | Specimen 2 broke at 11,023 newtons but data not used. |
| CPETS-3-205-4_4.25:1 | 8923 | 28.57 | 373.5 | 4.25:1 @125degrees centigrade |
| CPETS-CP-R-1 | 1933 | 6.55 | 295 | Circle punch |
| CPETS3-230-QT2-R-1 | 2095 | 10.66 | 196.6 | 3.1:1 DR. stretched on 4/12/06 at 125degrees centigrade. |
| CPETS3-203-QT2-R-3 | 2482 | 6.95 | 357 | 4.4:1 @160 degrees centigrade tested on 4/20 and 4/21/06 |
| CPETS3-205-QT2-R-5 | 2436 | 8.9 | 301 | 4.17:1 |
| CPETS3-205-QT2-R-6 | 2104 | 10.28 | 205 | 3.27:1 140degrees centigrade. . spd change=0.148mpm date 4-14-06 |
| CPET 3mm dogbone | 1577 | 4.11 | 384 | mini-dogbone samples, 40mm gauge length, 180 C in hot-box, 15 min,5.3:1 |

FIG. 8

Table 2

Representative Specific Strength of Different Samples

| Sample | Description | N/mm2 | Comments |
|---|---|---|---|
| HDPE 1 | Unstretched | 23 | 2.9 mm thick |
| HDPE 2 | Punched/Stretched | 163 | 2.9 mm thick |
| APET 1 | Unstretched | 61 | 3 mm thick |
| APET 2 | Punched/Stretched | 63 | 3 mm thick |
| APET 3 | Punched/Stretched/Crystallized | 178 | 3 mm thick |
| CPET1 | Unstretched | 78 | 6 mm thick |
| CPET 2 | Punched/Stretched | 254 | 6 mm thick |
| CPET 3 | Unstretched | 63 | 3 mm thick |
| CPET 4 | Punched/Stretched | 373 | 3 mm thick |
| CPET 5 | mini dog bone_stretched | 384 | 3 mm thick |
| PETG 1 | Unstretched | 51 | 3 mm thick |
| PETG 2 | Punched/Stretched | 78 | 3 mm thick |

FIG. 10

Effect of Stretch Ratio on Specific Strength

CPET 3mm

| Stretch Ratio | Specific Strength (N/mm2) |
|---|---|
| 3.1 | 197 |
| 3.27 | 205 |
| 4.17 | 301 |
| 4.4 | 357 |
| 5.3 | 384 |

CPET 55 mil (1.4 mm) Stretch Ratio 4.25:1 Rig#24

FIG. 13
PRIOR ART

Comparison of Some Basic Properties of Different Polymers Used to Produce Staple Fibers, Continuous Filaments, and Oriented Tapes That are Candidates for Use in Geotextiles[a]

| Polymer property | PA | N6 | N6.6 | PET | PP | LDPE | HDPE |
|---|---|---|---|---|---|---|---|
| Density, kg $m^{-3}$ | 1450 | 1140 | 1140 | 1380 | 900–910 | 920–930 | 940–960 |
| Crystallinity, % | 90 | 60 | 60 | 30–40 | 60–70 | 40–55 | 60–80 |
| $T_g$, °C | 340 | 30–60 | 30–60 | 75 | −15 to 10 | −100 | −100 |
| $T_m$, °C | 550 | 215–220 | 250 | 250–260 | 160–165 | 110–120 | 125–135 |
| Water adsorption at 20°C, 65% RH | 0–4 | 0–4 | 0–4 | 0–4 | 0 | 0 | 0 |
| Tensile strength (dry), N $mm^{-2}$ | 2760 | 700–900 | 700–900 | 800–1200 | 400–600 | 80–250 | 350–600 |
| Breaking strain (dry), % | 2.6 | 18–25 | 15–28 | 8–15 | 10–40 | 20–80 | 10–45 |
| Tensile strength (wet), N $mm^{-2}$ | — | 600–800 | 600–800 | 800–1200 | 400–600 | 80–250 | 350–600 |
| Breaking strain (wet), % | — | 20–30 | 18–30 | 8–15 | 10–40 | 20–80 | 10–15 |

Key: PA, *para*-aramid (e.g., Kevlar 49); N6, nylon 6; N6.6, nylon 6.6; PET, polyester; PP, polypropylene; LDPE, low-density polyethylene (used primarily as a bonding/encapsulating polymer); HDPE, high-density polyethylene; $T_g$, second-order transition temperature; $T_m$, melting temperature.

FIG. 14
PRIOR ART

Relative Chemical Resistance of Fiber-Forming Polymers Used in Geotextiles[a]

| Polymer | Nylon | | PET | | PP | | PE | |
|---|---|---|---|---|---|---|---|---|
| Chemical | A | B | A | B | A | B | A | B |
| Dilute acid | 2 | 1 | 3 | 2 | 3 | 3 | 3 | 3 |
| Concentrated acid | 1 | 0 | 1 | 0 | 3 | 2 | 3 | 2 |
| Dilute alkali | 3 | 2 | 3 | 1 | 3 | 3 | 3 | 3 |
| Concentrated alkali | 1 | 0 | 1 | 0 | 3 | 3 | 3 | 3 |
| Salt (brine) | 3 | 3 | 3 | 3 | 3 | 3 | 3 | 3 |
| Mineral oil | 3 | 3 | 3 | 3 | 2 | 1 | 2 | 1 |
| UV | 2 | 1 | 2 | 1 | 1 | 0 | 1 | 0 |
| UV (stabilized) | 3 | 2 | 3 | 2 | 3 | 2 | 3 | 2 |
| Heat (dry), 100°C | 3 | 2 | 3 | 3 | 3 | 2 | 3 | 1 |
| Steam, 100°C | 3 | 2 | 1 | 0 | 1 | 0 | 1 | 0 |
| Moisture absorption | 3 | 3 | 3 | 3 | 3 | 3 | 3 | 3 |
| Creep tendency | 3 | 2 | 3 | 3 | 2 | 1 | 2 | 1 |

Key: A, short-term, installation; B, long-term, use; PET, polyester; PP, polypropylene; PE, polyethylene; 0, no resistance; 1, moderate resistance; 2, passable resistance; 3, good resistance.

FIG. 15
PRIOR ART

Results of Various Geotextile Fabric Tensile Tests
(Expressed as Percentage of Strength at Zero Time Exposure)[a]

| Exposure time (days) | PP woven | PVC woven | PET needled nonwoven | PP needled nonwoven | PET heatset nonwoven | PP heatset nonwoven |
|---|---|---|---|---|---|---|
| (a) Tap water, pH = 7 | | | | | | |
| 0 | 100 | 100 | 100 | 100 | 100 | 100 |
| 1 | 97 | 100 | 100 | 83 | 96 | 102 |
| 4 | 86 | 92 | 100 | 83 | 104 | 102 |
| 7 | 95 | 110 | 100 | 110 | 110 | 101 |
| 14 | 100 | 98 | 97 | 93 | 96 | 92 |
| 28 | 91 | 110 | 97 | 100 | 93 | 90 |
| 42 | 91 | 110 | 100 | 100 | 100 | 106 |
| 63 | 95 | 99 | 100 | 92 | 110 | 99 |
| 96 | 100 | 110 | 100 | 98 | 97 | 96 |
| 120 | 103 | 109 | 110 | 110 | 94 | 93 |
| (b) CaO solution, pH = 10 | | | | | | |
| 0 | 100 | 100 | 100 | 100 | 100 | 100 |
| 1 | 96 | 99 | 100 | 98 | 100 | 105 |
| 4 | 93 | 99 | 100 | 100 | 110 | 126 |
| 7 | 110 | 120 | 99 | 100 | 110 | 97 |
| 14 | 97 | 110 | 99 | 100 | 94 | 92 |
| 28 | 110 | 110 | 99 | 100 | 90 | 102 |
| 42 | 110 | 120 | 93 | 90 | 95 | 111 |
| 63 | 110 | 130 | 92 | 100 | 92 | 105 |
| 96 | 110 | 120 | 94 | 100 | 94 | 99 |
| 120 | 100 | 110 | 91 | 100 | 94 | 92 |
| (c) CaO solution, pH = 12 | | | | | | |
| 0 | 100 | 100 | 100 | 100 | 100 | 100 |
| 1 | 110 | 110 | 97 | 89 | 91 | 111 |
| 4 | 96 | 120 | 95 | 87 | 94 | 92 |
| 7 | 110 | 110 | 96 | 100 | 95 | 86 |
| 14 | 110 | 110 | 94 | 99 | 88 | 114 |
| 28 | 100 | 110 | 92 | 93 | 92 | 101 |
| 42 | 96 | 100 | 74 | 94 | 86 | 85 |
| 63 | 100 | 110 | 73 | 85 | 82 | 104 |
| 96 | 98 | 100 | 70 | 92 | 80 | 110 |
| 120 | 97 | 100 | 70 | 110 | 80 | 89 |

INTEGRAL POLYETHYLENE TEREPHTHALATE GRIDS, THE METHOD OF MANUFACTURE, AND USES THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a national stage of PCT/US08/001481 filed Feb. 5, 2008 and published in English, which claims the benefit of priority to U.S. Provisional Application for Patent No. 60/899,658 filed Feb. 6, 2007, hereby incorporated by reference.

BACKGROUND OF THE INVENTION

1. Field of the Invention

The present invention relates generally to integral polymer geogrids and other oriented grids used for structural or construction reinforcement purposes. More particularly, the present invention relates to such integral polymer grids made from homopolymer and copolymer polyethylene terephthalate ("PET") in order to achieve a higher tensile strength to weight ratio and a higher creep reduced strength to weight ratio.

This invention also relates to the method of producing such integral PET grids. Lastly, the present invention relates to the use of such integral PET grids for soil reinforcement and methods of such reinforcement.

For the purpose of this invention, the terms "integral PET grid" and "integral PET grids" are intended to include integral polyethylene terephthalate geogrids and other integral polyethylene terephthalate grid structures made by orienting (stretching) starting materials in the form of sheets or the like having holes or depressions made or formed therein.

2. Description of the Prior Art

Polymeric integral grid structures having mesh openings defined by various geometric patterns of substantially parallel, orientated strands and junctions therebetween, such as geogrids, have been manufactured for over 25 years. Such grids are manufactured by extruding an integrally cast sheet which is subjected to a defined pattern of holes or depressions followed by the controlled uniaxial and biaxial orientation of the sheet into strands and junctions defined by mesh openings formed by the holes or depressions. Orienting the sheet in either the uniaxial or biaxial direction develops strand tensile strength and modulus in the corresponding direction. These integral oriented polymer grid structures can be used for retaining or stabilizing particulate material of any suitable form, such as soil, earth, sand, clay, gravel, etc. and in any suitable location, such as on the side of a road or other cutting or embankment, beneath a road surface, runway surface, etc.

Various shapes and patterns of holes have been experimented with to achieve higher levels of strength to weight ratio, or to achieve faster processing speeds during the manufacturing process. Orientation is accomplished under controlled temperatures and strain rates. Some of the variables in this process include draw ratio, molecular weight, molecular weight distribution, and degree of branching or cross linking of the polymer. As a result of the orientation process, the finished product has a much higher tensile modulus and a highly reduced creep sensitivity.

The manufacture and use of such geogrid and other integral polymer grid structures can be accomplished by well-known techniques. As described in detail in U.S. Pat. No. 4,374,798 to Mercer et al. ("Production of Plastic Mesh Structure"), U.S. Pat. No. 5,419,659 to Mercer et al. ("Plastic Material Mesh Structure"), U.S. Pat. No. 4,590,029 to Mercer et al. ("Molecularly Orienting Plastics Material"), U.S. Pat. No. 4,743,486 to Mercer and Martin ("Product and Method of Producing a Plastics Material Mesh Structure"), and U.S. Pat. No. 4,756,946 to Mercer ("Plastic Material Mesh Structure"), a starting polymeric sheet material is first extruded and then punched to form the requisite defined pattern of holes or depressions.

As disclosed in the aforesaid patents, the starting sheet material is uniplanar or substantially uniplanar. As further described in the aforesaid patents, the uniplanar or substantially uniplanar punched starting material can be stretched only in the machine direction whereby the polymeric material between the punched holes is stretched to form highly molecularly oriented parallel strands interconnected by parallel transverse bars substantially at right angles to the strands. The stretching is continued so that the molecular orientation extends into the mostly unoriented transverse bar, which forms the junctions between the aligned strands. This uniaxial stretching of the punched starting material forms a uniaxial integral mesh structure, or uniaxial integral geogrid. The uniaxial integral geogrid is substantially uniplanar and has a plurality of highly oriented parallel strands that are interconnected by partially oriented junctions in the transverse bar, all substantially symmetrical about a median plane. The highly oriented parallel strands and the parallel transverse bars form an array of longitudinal openings between the parallel strands.

As further described in the aforesaid patents, when the substantially uniplanar starting material is biaxially stretched, i.e., first in the machine direction and then in the transverse direction, the stretching forms a biaxial integral mesh structure, or biaxial integral geogrid. The biaxial integral geogrid is also substantially uniplanar and has a plurality of highly oriented strands interconnected by partially oriented junctions, all substantially symmetrical about a median plane. The highly oriented strands and the partially oriented junctions define an array of mesh openings in the biaxial integral geogrid.

When imparting the high molecular orientation to the strands of the biaxial integral geogrid during the biaxial stretching, the molecular orientation is caused to extend into the junctions and around the crotch of the partially oriented junctions between adjacent oriented strands.

It is intended that the present invention be applicable to all integral PET grids regardless of the method of forming the starting material or orienting the starting material into the geogrid or grid structure. The subject matter of the foregoing patents is expressly incorporated into this specification by reference as if the patents were set forth herein in their entireties. These patents are cited as illustrative, and are not considered to be inclusive, or to exclude other techniques known in the art for the production of integral polymer grid materials.

Traditionally, the polymeric materials used in the production of integral grids have been high molecular weight homopolymer or copolymer polypropylene, and high density, high molecular weight polyethylene. Various additives, such as ultraviolet light inhibitors, carbon black, processing aids, etc., are added to these polymers to achieve desired effects in the finished product.

While the conventional polypropylene and polyethylene materials exhibit generally satisfactory properties, it is structurally and economically advantageous to produce a grid material having a higher tensile strength to weight ratio and a higher creep reduced strength to weight ratio.

Creep is the process by which the dimensions of a material change with time, while subjected to a sustained or variable load. See, e.g., FIGS. 4 and 5. FIG. 4 illustrates comparative creep curves for various conventional polymeric geotextile materials such as polypropylene and polyester under loading of 40% ultimate strength. FIG. 5 shows representative creep curves for filaments of various polymers.

The creep behavior of a synthetic material is a function not only of polymer type and physical structure, but also of factors such as geometric structure (e.g., woven, nonwoven, integral grid, etc.), surrounding medium, environmental temperature, presence of any micro or macro damage, and aging.

With regard to the temperature factor, polymers creep significantly when exposed to stress above their glass transition temperature, $T_g$. This means that high density polyethylene ("HDPE") and polypropylene ("PP"), with a $T_g$ of −120° C. and −18° C., respectively, creep substantially more at ambient temperature then does PET, which has a $T_g$ of 69° C.

Another method of manufacturing grids employs weaving or knitting technology. High tenacity filaments of either PET or polypropylene are twisted together to form yarn. These yarns are either woven or knitted into open structured fabric and then coated with a protective coating to provide protection to the core yarns. The protective coating can be, for example, polyvinyl chloride (PVC), a bituminous substance, or latex. The primary difference between products manufactured using this technology and the aforementioned integral grids is that the woven or knitted products have flexible junctions with considerably low junction strength. Some examples of such grids are the geogrids manufactured by companies such as Merex, Huesker, and Strata. FIG. 13 of the drawings summarizes basic properties of various polymers typically used to produce staple fibers, continuous filaments, and oriented tapes.

Still another method of manufacturing grids uses highly oriented ribs or straps of polyester. The ribs are processed in a welding device in which cross machine direction ribs are introduced and welded together forming dimensional apertures. An example of such a grid is the Secugrid® manufactured by NAUE Gmbh & Co. The junction strength of products manufactured using this method tends to fall between that of integral grids and woven/knit grids.

Therefore, a need exists for an integral polymer material that not only is suitable for use in geogrid service, but that exhibits a higher tensile strength to weight ratio and a higher creep reduced strength to weight ratio than those values associated with conventional geogrid materials.

SUMMARY OF THE INVENTION

Polyethylene terephthalate ("PET") is an attractive polymer for use in soil reinforcement projects because it is a relatively low cost commodity polymer, demonstrates high tenacity and low creep behavior, and is fairly resistant to naturally occurring chemicals in soil.

As is evident from its structural formula (below), PET is a much bulkier molecule than polyethylene:

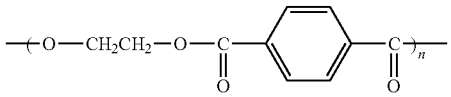

The PET molecule is planar, as required by resonance, but the main chains are not planar due to rotation about the C—O bond. The stiffening action of the p-phenylene group leads to a high melting point and good fiber forming properties.

Accordingly, it is an object of the present invention to produce an integral geogrid or other grid structure from a polyethylene terephthalate starting material according to known process methods, such as those described in the aforementioned U.S. Pat. Nos. 4,374,798, 5,419,659, 4,590,029, 4,743,486, 4,756,946, as well as many other patents.

As indicated above, high density polyethylene and polypropylene, with a $T_g$ of −120° C. and −18° C., respectively, creep substantially more at ambient temperature then does polyethylene terephthalate, which has a $T_9$ of 69° C. In PET, since the $T_g$ is much higher than ambient temperature, creep is largely attributable to steric reorganization of the tightly packed non-crystalline region polymer chain segments, which results in little or no chain slippage.

As a result, a PET material is characterized by a higher creep reduced strength to weight ratio than that of conventional geogrid materials. That is, since PET exhibits much lower creep than does, for example, HDPE, the PET can be used at up to about 70% of ultimate tensile strength, but HDPE only up to about 40%. Accordingly, for an integral geogrid material possessing a specified creep value, an integral PET grid will weigh substantially less than a geogrid using a conventional geogrid material, such as HDPE or PP.

In addition, a PET material is characterized by a higher tensile strength to weight ratio than that of conventional geogrid materials. For example, at comparable stretch ratios, crystalline PET ("CPET") exhibits almost double the specific strength of HDPE.

Therefore, another object of the present invention is to provide an integral polymer grid made from homopolymer and copolymer polyethylene terephthalate that is characterized by both a higher tensile strength to weight ratio and a higher creep reduced strength to weight ratio than those values associated with integral polymer grids made of conventional geogrid materials.

In addition to the aforementioned structural advantages, PET exhibits good resistance to salts, organic acids, organic solvents, oxidizing agents, reducing agents, and petroleum components, including bitumen often found in soil and related materials. As a result, the integral PET grid according to the present invention is especially attractive for use in soil reinforcement service.

Therefore, still another object of the present invention is to provide an integral polymer grid made from homopolymer and copolymer polyethylene terephthalate that exhibits good resistance to various agents encountered in soil reinforcement service.

These together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

BRIEF DESCRIPTION OF THE DRAWINGS

FIG. 6 is a table summarizing the tensile test results of the various polymeric samples tested.

FIG. 8 is a table summarizing the specific strength of certain representative samples shown in FIG. 7.

FIG. 10 is a table summarizing the effect of the stretch ratio on the specific strength of a PET sample.

FIG. 13 is a table summarizing basic properties of various polymers typically used to produce staple fibers, continuous filaments, and oriented tapes.

FIG. 14 is a table summarizing the relative chemical resistance of various fiber-forming polymers used in geotextiles.

FIG. 15 is a table summarizing the effect of pH on the tensile strength of various geotextile polymers.

DETAILED DESCRIPTION OF THE PREFERRED EMBODIMENTS

Figure 1:
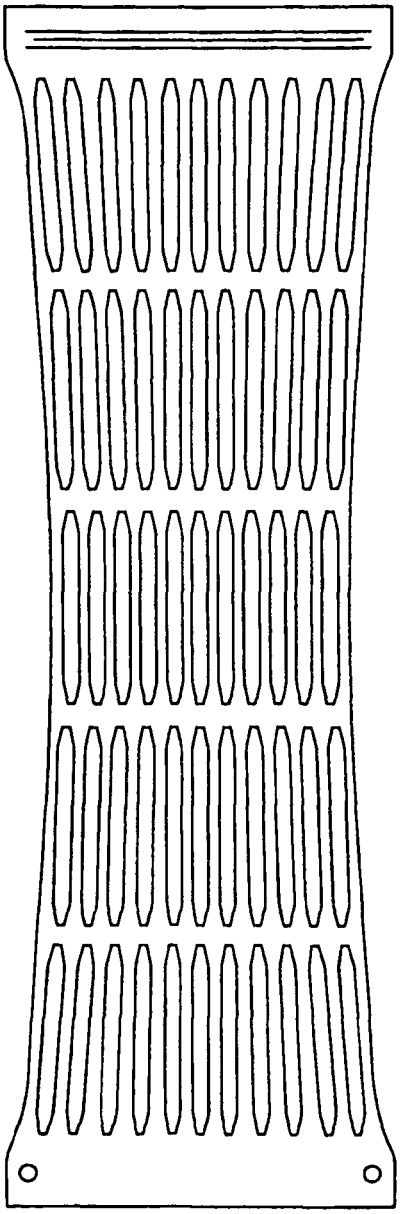
FIG. 1 illustrates a sample of a crystalline polyethylene terephthalate (CPET) grid according to one embodiment of the present invention in which the starting sheet was uniaxially stretched to a stretch ratio of 3.1:1.

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

In order to understand the behavior and properties of the PET material, and to establish the parameters of using PET to make integral grids, instead of HDPE, standard commercially available extruded sheets of PET were procured. Three types of PET sheets were used: amorphous PET ("APET"), crystalline PET ("CPET"), and PET glycol ("PETG").

Punched samples for each of the three types of PET sheet were prepared with standard sheet punches such as those used to manufacture HDPE UX products sold by the Tensar International Corporation, Inc. (hereinafter "Tensar") (Atlanta, Ga.), the assignee of the instant provisional application for patent. For example, FIG. 1 shows a CPET starting sheet sample prepared using a punch (1.53"×0.375") and uniaxially stretched to a stretch ratio of 3.1:1.

The punched sheet uniaxial stretching was performed on a Tensar laboratory stretcher. Tensar carried out initial laboratory work in accordance with the present invention by stretching narrow strips, i.e., from 2 mm to 4 mm wide, of PET and HDPE to establish the temperature and stretch ratio conditions under which the testing would be conducted. The temperature range was established to be between 100° C. and 240° C., and the stretch ratio range to be between 2:1 and 10:1. These temperature and stretch ratio conditions were then used during stretching of the approximately 8"×10" punched samples.

For high temperature stretching, i.e., above 160° C., an Instron "Hot-Box" was installed on an Instron Model 1125 tensile testing machine. Standard "dog bone"-shaped samples of CPET, having an initial thickness of 3 mm, were heated to, and then conditioned at, 180° C. for 15 minutes. The heat-conditioned samples were then uniaxially stretched in the lab stretcher in accordance with standard stretching protocols used by Tensar. The samples were stretched to the maximum stretch ratio that was allowed by the size of the Hot-Box, i.e., a ratio of 5.3:1. These 5.3:1 samples were then tested for both tensile and creep properties.

The unstretched and stretched strips and ribs from the 8"×10" samples were tested for tensile properties on an Instron Model 1125 tensile testing machine using serrated pneumatic grips. The testing grips were padded with cardboard and/or sandpaper to prevent slippage and edge break. The tensile data was normalized for the difference in sheet thickness between the HDPE and the PET by dividing the tensile results by the initial cross-sectional area of the test specimen (i.e., the resultant tensile data has the units of $N/mm^2$). This normalization enabled a material-to-material comparison without the need to standardize the physical dimensions of the test specimens.

Finally, a strength to basis weight comparison was made between standard Tensar HDPE UX products and the 8"×10" PET punched and stretched samples.

For creep testing, the 5.3:1 stretch ratio samples were suspended under a load at room temperature in a quality control laboratory. One sample was suspended under a load corresponding to 60% of ultimate tensile strength (FIG. 2), and a second sample was suspended under a load corresponding to 70% of ultimate tensile strength (FIG. 3).

Figure 7:
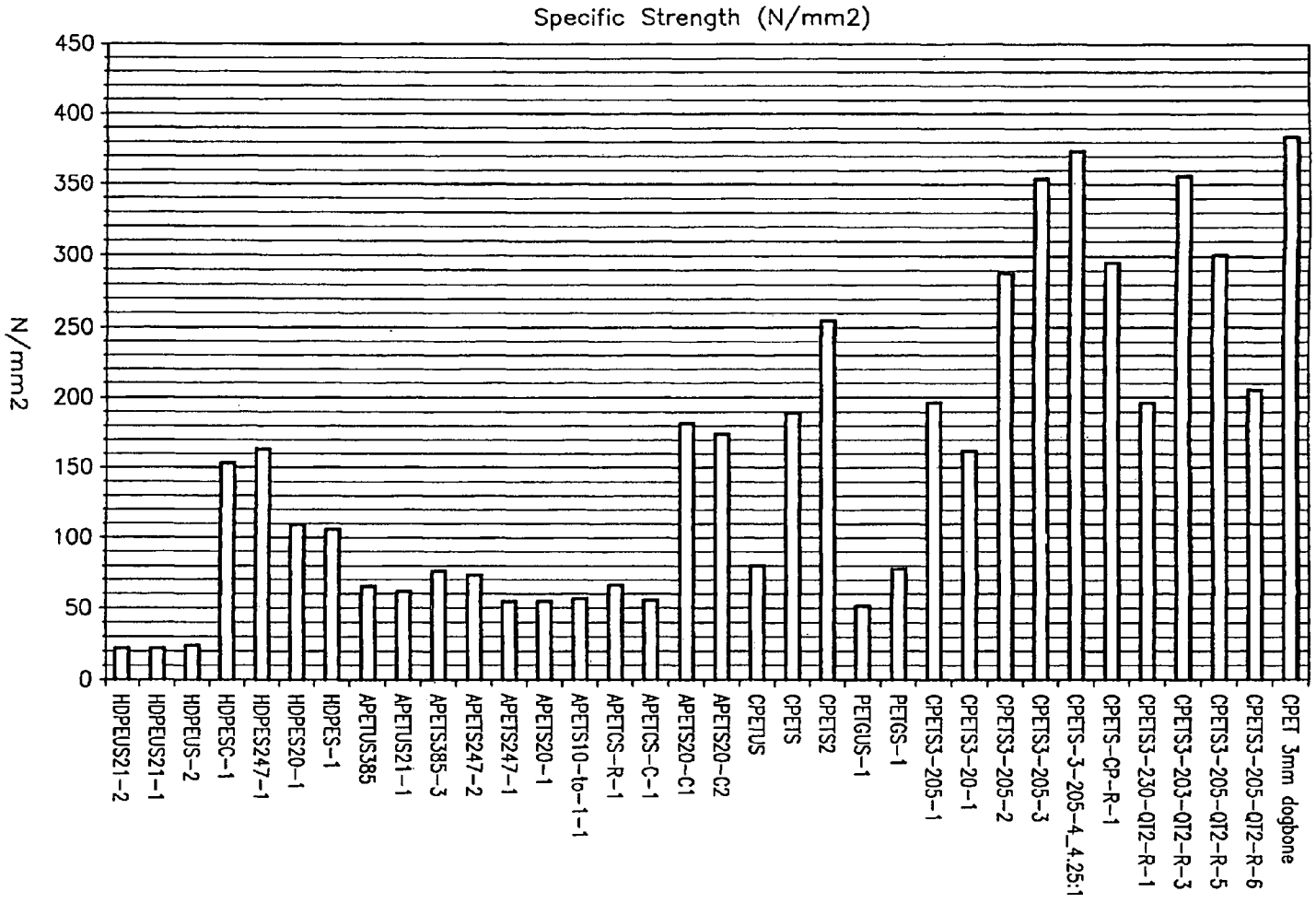
FIG. 7 is a chart illustrating the specific strength of the samples shown in FIG. 6.
Figure 9:
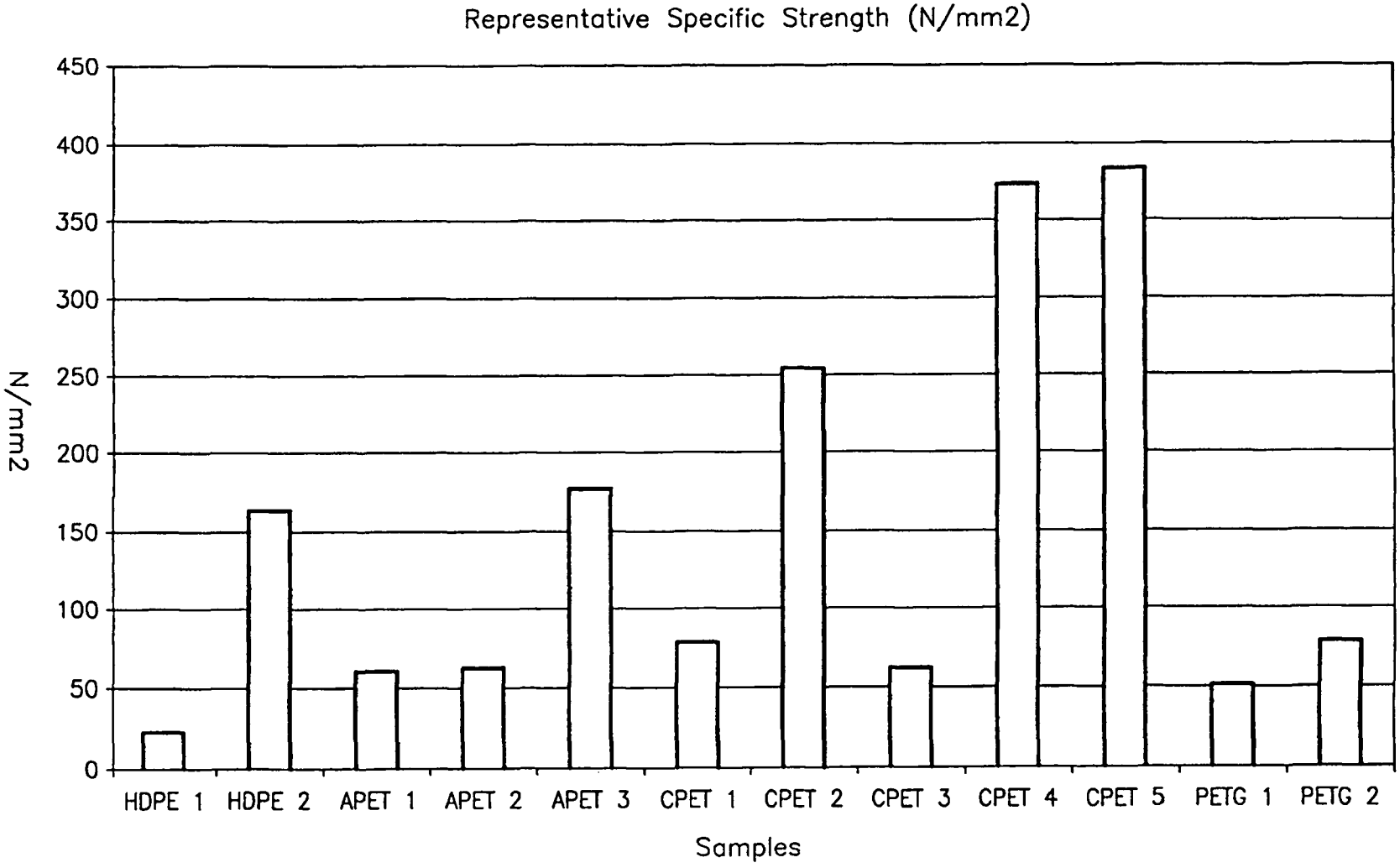
FIG. 9 is a chart summarizing the specific strength of the representative samples shown in FIG. 8.

Tensile strength test data associated with the aforementioned 5.3:1 stretch ratio samples is presented in FIGS. 6 and 7. A summary of representative data from FIGS. 6 and 7 is presented in FIGS. 8 and 9. FIG. 8 presents representative specific strength values for each type of polymer at unstretched and maximum stretch ratio conditions.

Figure 11:
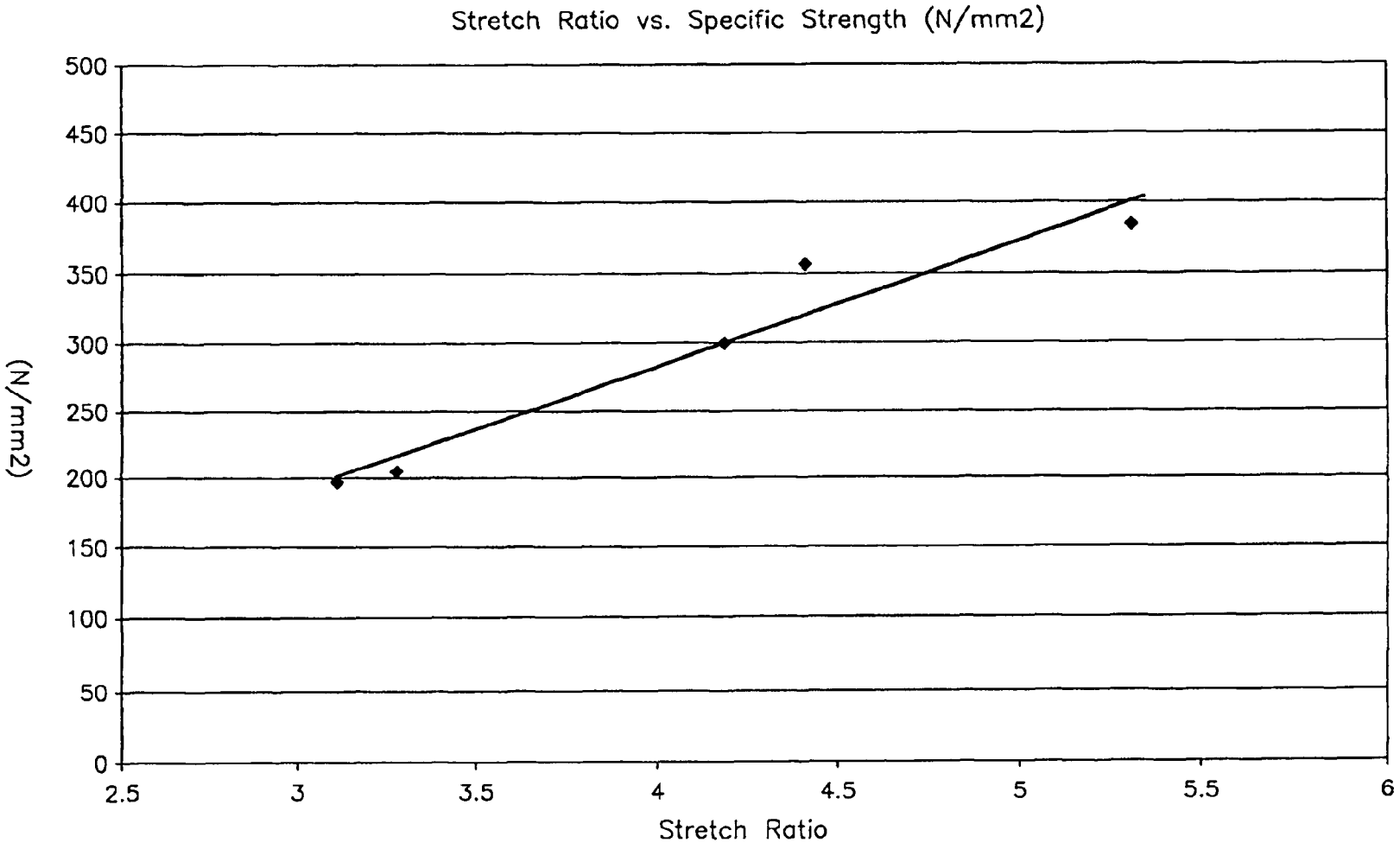
FIG. 11 is a graph depicting the effect of the stretch ratio on the specific strength summarized in FIG. 10.

Since the 3 mm thick CPET starting sheet provided the maximum specific strength among the samples summarized in FIGS. 6-8, samples of the 3 mm CPET starting sheet were uniaxially stretched at various ratios of from 3.1:1 to 5.3:1. These results are shown in FIGS. 10 and 11. From this data it is evident that for the 3 mm CPET starting sheet there exists a substantially linear relationship between stretch ratio and specific tensile strength (see FIG. 11).

As is evident from the results presented herein, CPET is a good candidate for the manufacture of extruded and uniaxially stretched integral grids because of a higher specific strength and better creep characteristics. At comparable stretch ratios, CPET exhibits almost double the specific strength of HDPE. That is, as is evident from FIG. 8, sample HDPE 2 (initial thickness of 2.9 mm) has a specific strength of 163 $N/mm^2$, while sample CPET 4 (initial thickness of 3 mm) has a specific strength of 373 $N/mm^2$.

Since APET starting sheets crystallize during the heated stretching operation, APET starting sheets can achieve a specific strength similar to that of HDPE. But, the required crystallization associated with the heated stretching of APET starting sheets makes the process slow and more expensive. Hence, CPET starting sheets are clearly preferred for the present invention.

The PETG starting sheets did not show any significant difference between unstretched and stretched samples even at a stretch ratio of 8.5:1.

Figure 2:
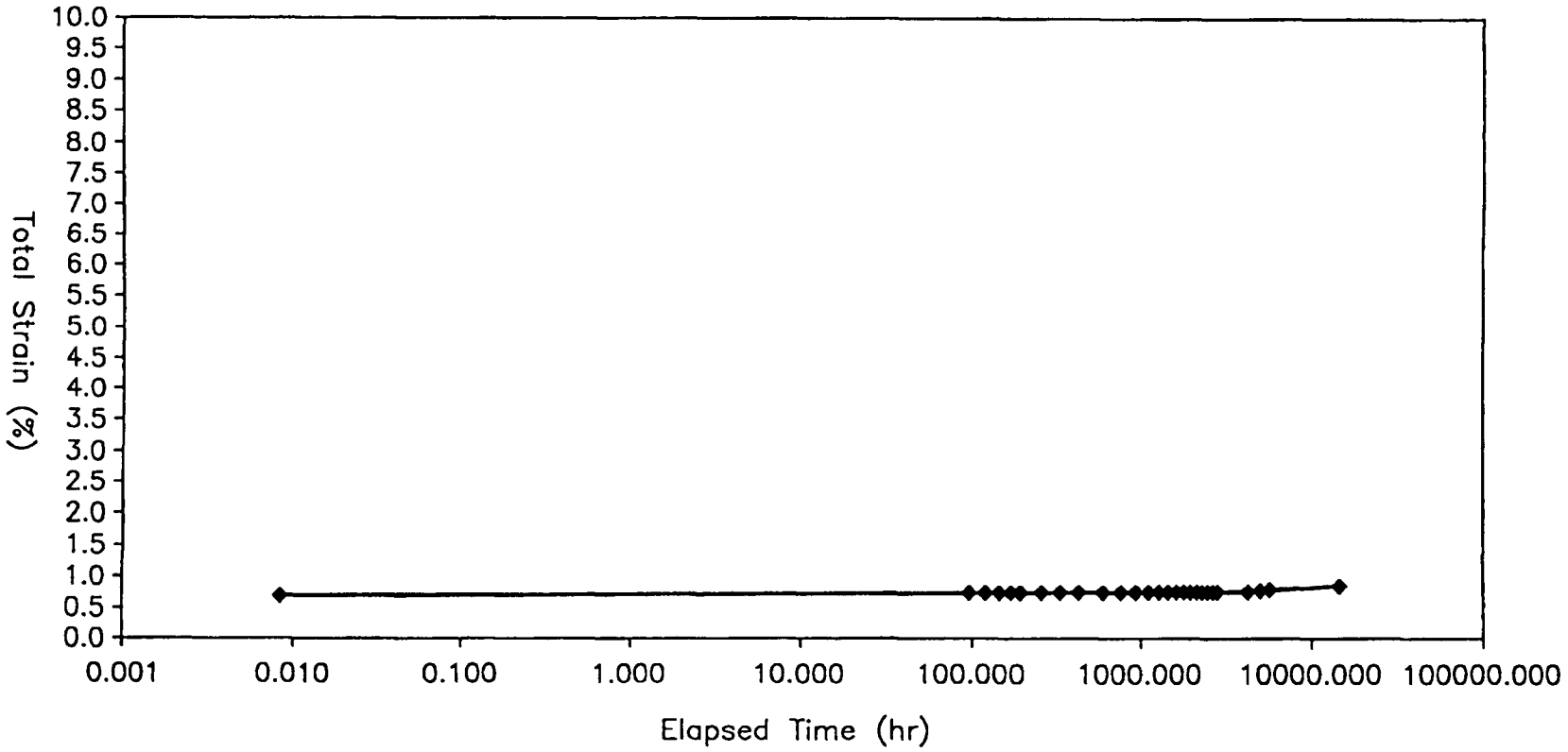
FIG. 2 is a creep test chart showing a creep curve for a CPET sample, initially 3 mm thick, which is uniaxially stretched to a stretch ratio of 5.3:1 and suspended under 60% loading.
Figure 3:
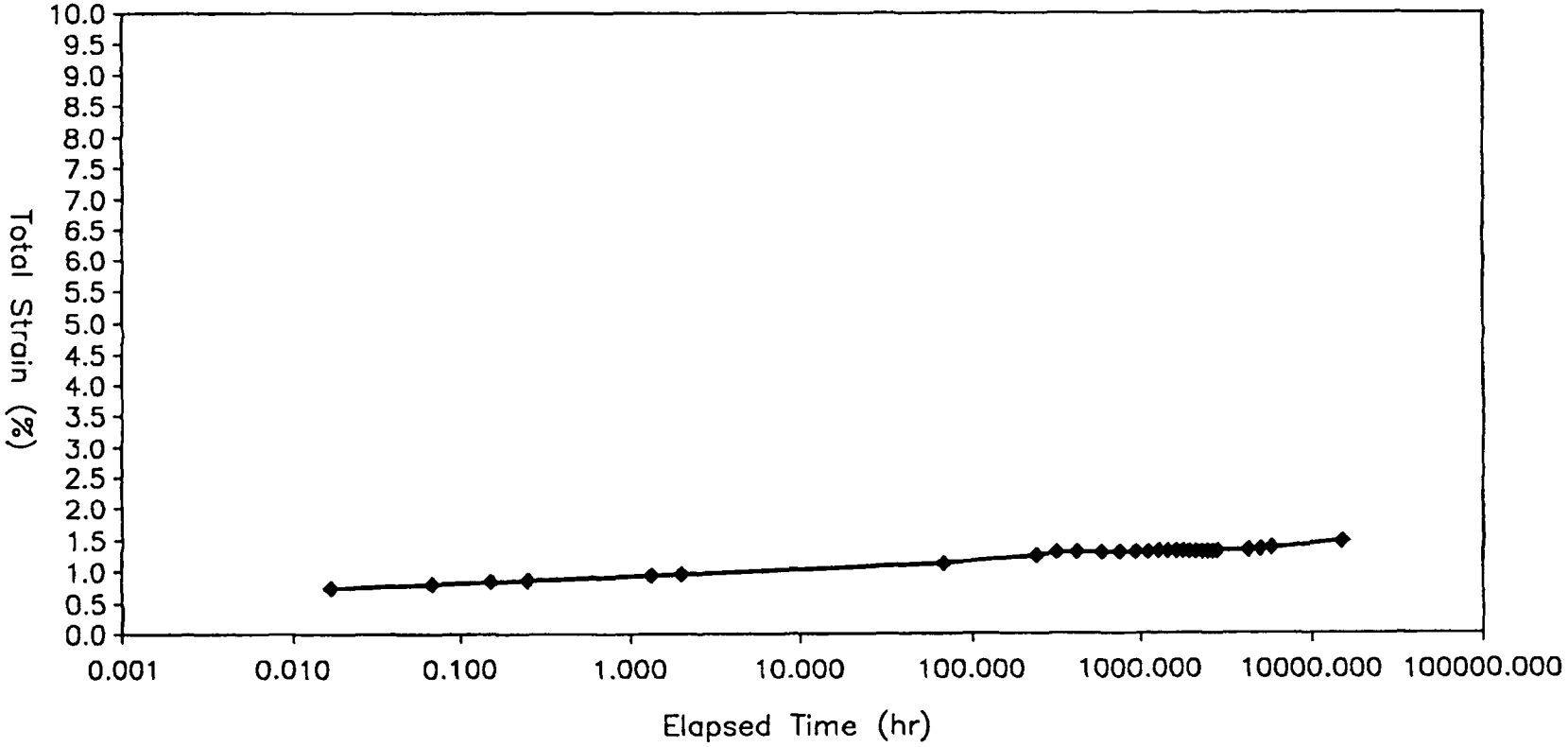
FIG. 3 is a creep test chart showing a creep curve for a CPET sample, also initially 3 mm thick, which is uniaxially stretched to a stretch ratio of 5.3:1, but suspended under 70% loading.
Figure 4:
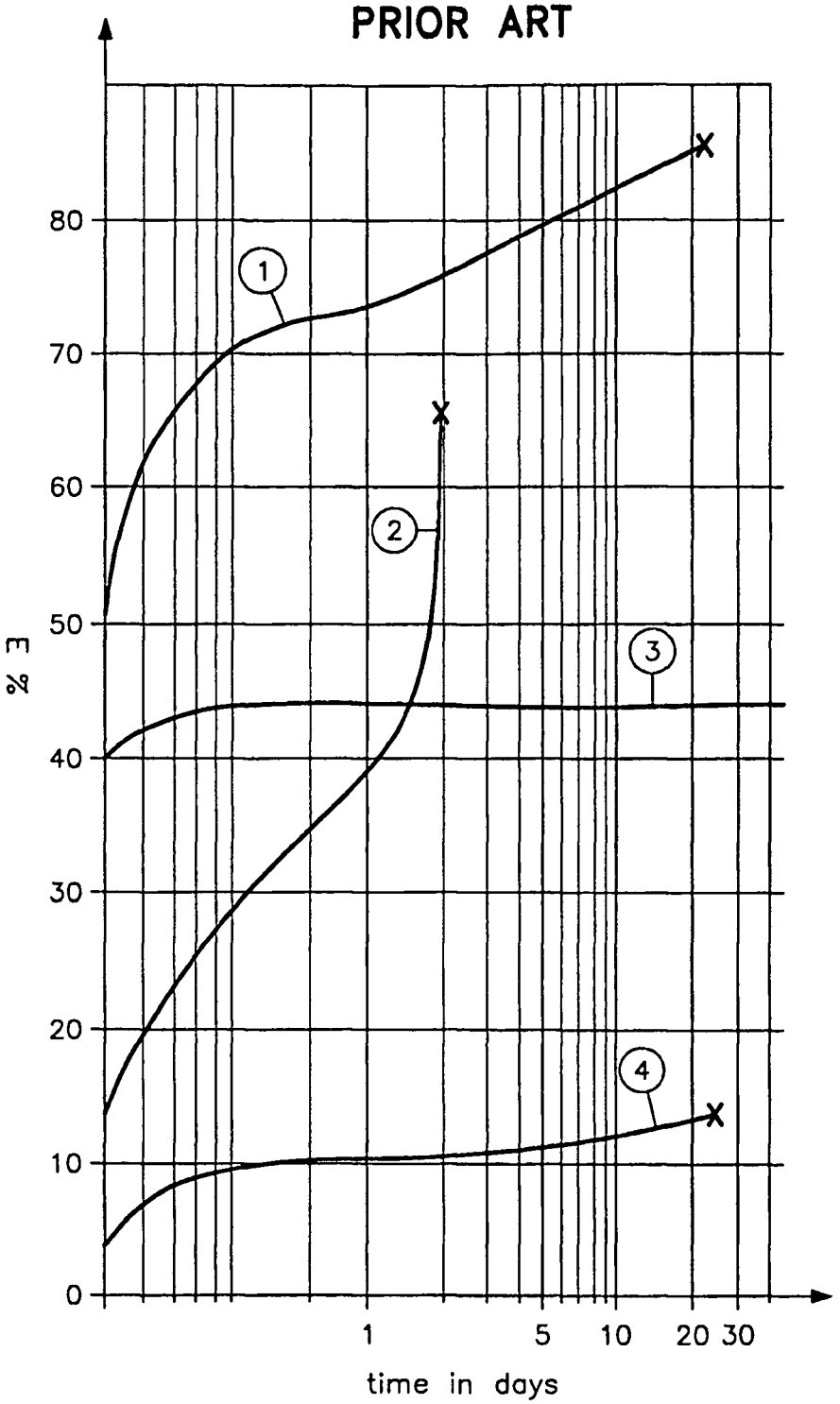
FIG. 4 PRIOR ART
FIG. 4 is a graph illustrating comparative creep curves for various polymeric geotextile materials under loading of 40% ultimate strength.

As is evident from FIGS. 2 and 3, the first 5600 hrs of creep data show that there is minimal strain associated with the CPET samples. That is, the strain is only 0.78% at 60% loading, and 1.34% at 70% loading.

Figure 12:
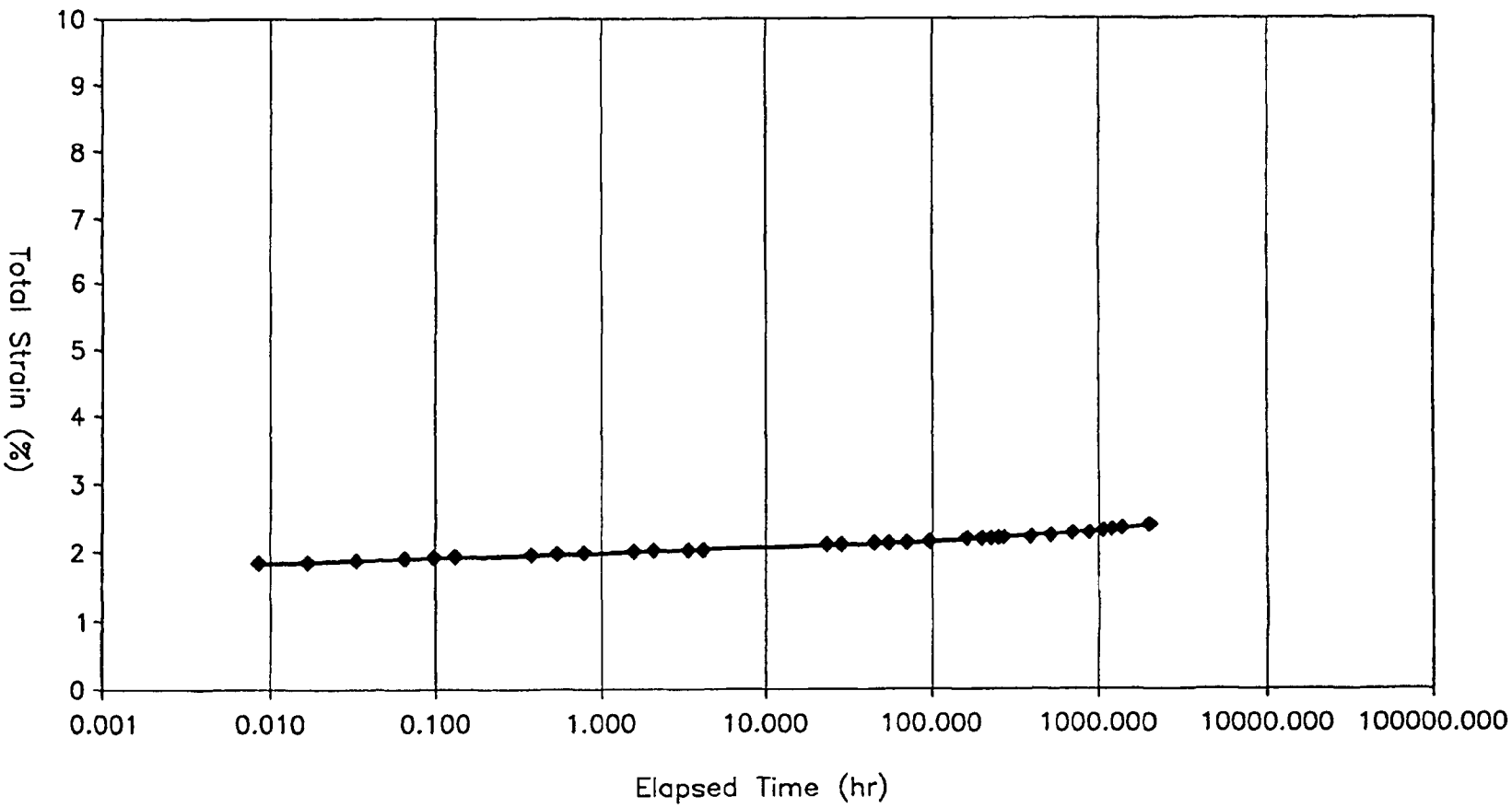
FIG. 12 is a creep test chart showing a creep curve for a CPET sample, initially 1.4 mm thick, which is stretched to a stretch ratio of 4.25:1 and suspended under 60% loading.

Another test demonstrated the ability to prepare a grid from a CPET sheet having an initial thickness of 1.4 mm. The sample was first punched, then stretched to a stretch ratio of 4.25:1, and finally placed under a loading of 60% of ultimate tensile strength. As is evident from FIG. 12, creep data for the 1.4 mm sample for the first 2000 hours shows a strain of only about 2.4%.

The inventive polymer mesh structure has been described herein primarily in the context of being one that is uniaxially oriented, i.e., as being produced via uniaxial stretching of the punched starting material so as to form a uniaxial integral mesh structure.

Figure 5:
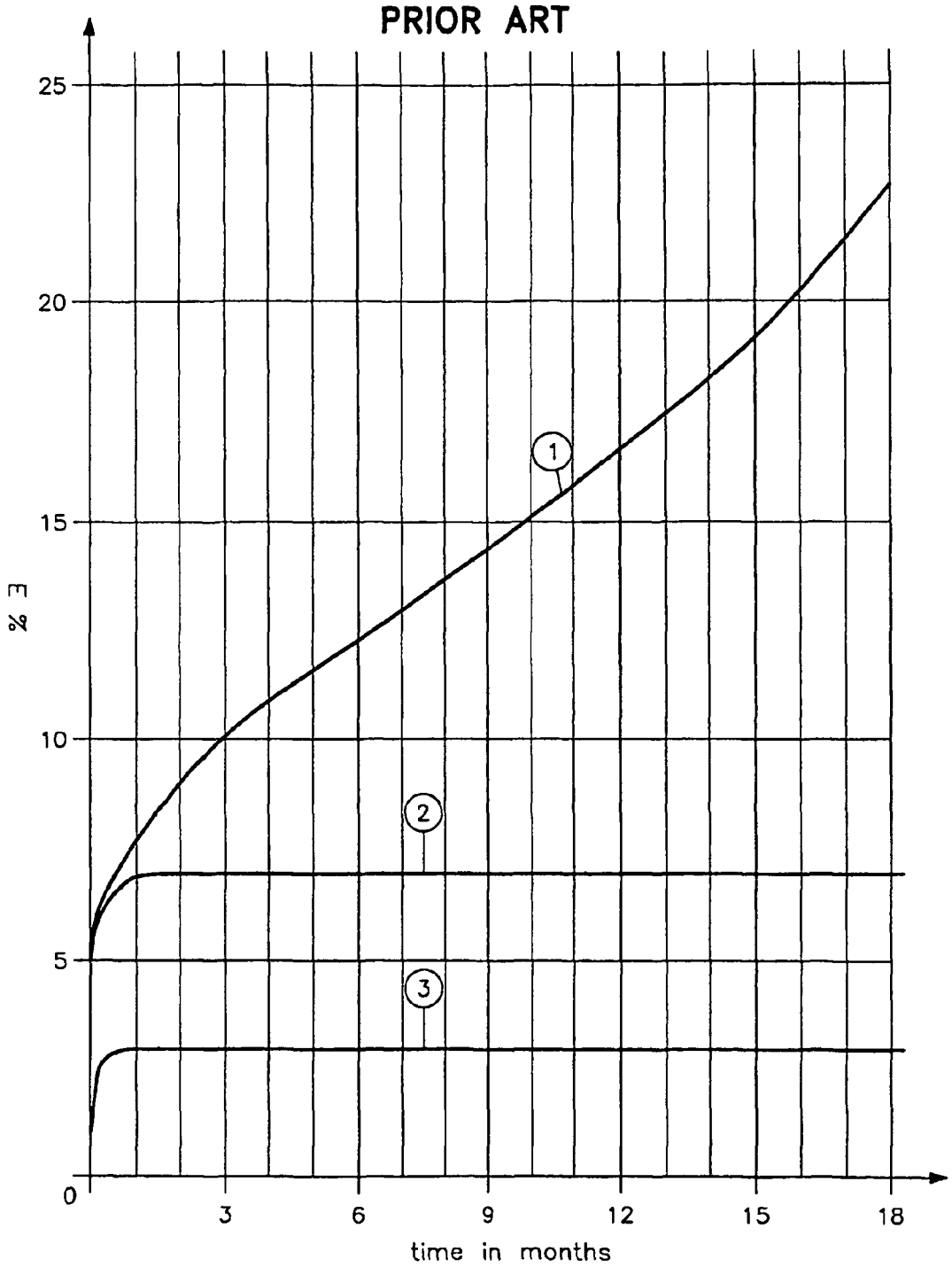
FIG. 5 PRIOR ART
FIG. 5 is a graph illustrating representative creep curves for filaments of various polymers.
Figure 16:
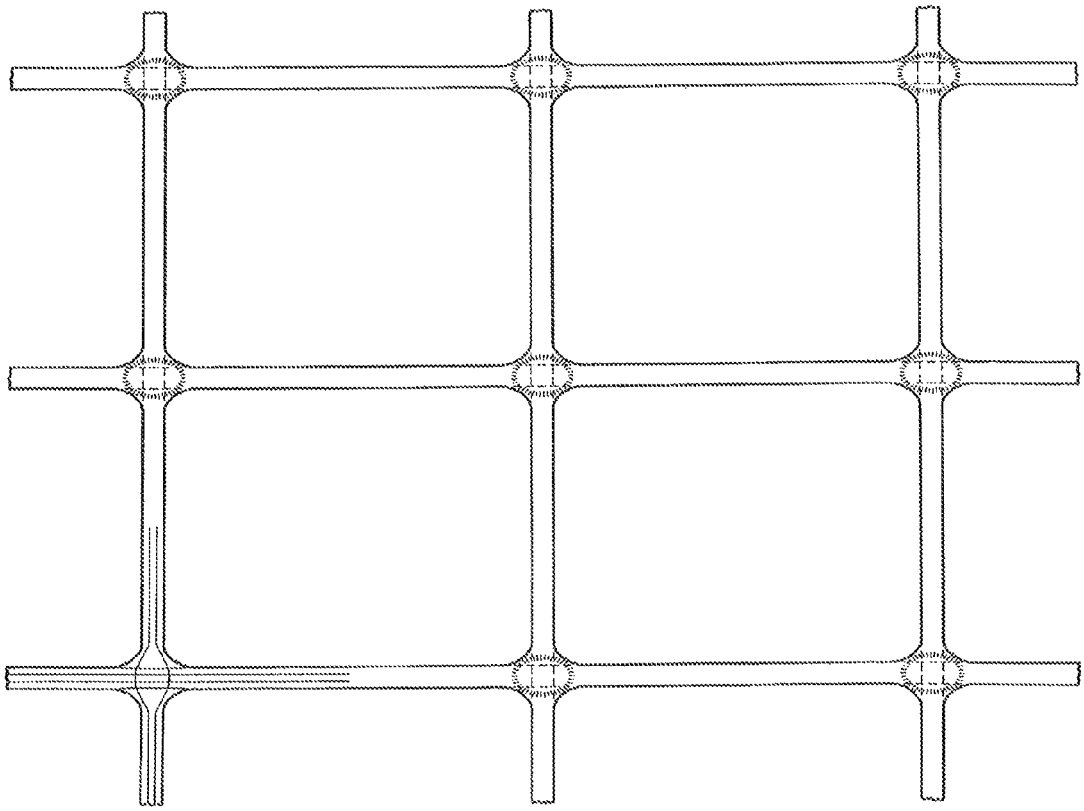
FIG. 16 illustrates a substantially uniplanar biaxial integral geogrid as shown for a composite of FIGS. 3 and 5 of U.S. Pat. No. 4,374,798.

However, in yet another possible embodiment of the invention, the polymer mesh structure is one that is biaxially oriented. That is, in this embodiment of the invention, the substantially uniplanar starting material is biaxially stretched, i.e., first in the machine direction and then in the transverse direction, so as to form a biaxial integral mesh structure. As indicated above in the Background section, such a biaxial orientation method is disclosed in certain of the above-described patents, such as U.S. Pat. No. 4,374,798 to Mercer et al. ("Mercer '798"). See, for example, FIG. 16 of the instant application, which illustrates a substantially uniplanar biaxial integral geogrid as shown for a composite of FIGS. 3 and 5 of the Mercer '798 patent. Accordingly, the instant invention is also directed to a biaxially oriented mesh structure having the polyethylene terephthalate integral geogrid.

While the integral PET grid according to the present invention exhibits the above-described advantageous characteristics, PET in general can be susceptible to hydrolysis during wet processing and in end use. PET is hydrolyzed by certain acids and by all strong bases, including some organic bases. The factors that can affect this hydrolysis include carboxyl end group ("CEG"), molecular weight, crystallinity, orientation, surface area, temperature, pH level, and the presence of cations. See FIG. 14, which summarizes the relative chemical resistance of various fiber-forming polymers used in geotextiles, and FIG. 15, which summarizes the effect of pH on the tensile strength of various geotextile polymers.

For example, one literature source has proposed that PET hydrolysis is proportional to the square root of the CEG concentration. I. M. Ward, Mechanical Properties of Solid Polymers, Wiley Interscience, New York, 1971. Molecular weight inversely affects the CEG concentration. Hence, a higher molecular weight PET will be less susceptible to hydrolysis. Orientation can also lessen the hydrolytic effect in that it reduces the diffusion rate of the penetrant.

Thus, while there are no specific additives that can retard hydrolysis in PET materials, one or more of the aforementioned variables of CEG, molecular weight, crystallinity, orientation, surface area, temperature, pH, and the presence of cations can be manipulated to improve resistance to hydrolysis.

The foregoing is considered as illustrative only of the principles of the invention. Further, since numerous modifications and changes may readily occur to those skilled in the art, it is not desired to limit the invention to the exact construction and operation described and shown.

What is claimed is:

1. A polymer mesh structure comprising a substantially uniplanar integral geogrid having a plurality of highly oriented strands interconnected by partially oriented junctions forming an array of openings in said geogrid, said integral geogrid formed of polyethylene terephthalate and having (a) a tensile strength per unit of cross-sectional area of from approximately 63$N/mm^2$ to approximately 384$N/mm^2$ and (b) a creep strain at 60% loading which starts out at about 0.75% and does not exceed about 1.00% after 10,000 hours loading.

2. The polymer mesh structure according to claim 1, wherein the highly oriented polyethylene terephthalate strands have been uniaxially or biaxially stretched.

3. The polymer mesh structure according to claim 1, wherein the polyethylene terephthalate is a homopolymer or a copolymer.

4. The polymer mesh. structure according to claim 1, wherein the polyethylene terephthalate is selected from the group consisting of amorphous polyethylene terephthalate, crystalline polyethylene terephthalate, and polyethylene terephthalate glycol.

5. The polymer mesh structure according to claim 1, wherein the plurality of highly oriented polyethylene terephthalate strands includes oriented transverse strands and oriented longitudinal strands interconnected by partially oriented polyethylene terephthalate junctions.

6. The polymer mesh structure according to claim 1, wherein the integral geogrid is configured for structural or construction reinforcement purposes.

7. The polymer mesh structure according to claim 1, wherein the plurality of highly oriented polyethylene terephthalate strands are aligned in a longitudinal array by unilateral stretching and each aligned pair of the highly oriented strands are interconnected by a partially oriented polyethylene terephthalate junction aligned in a transverse bar.

8. The polymer mesh structure according to claim 1, wherein the polyethylene terephthalate has a creep strain at 70% loading which starts out at about 0.75% and does not exceed about 1.50% after 10,000 hours loading.

9. A starting material for making an integral polymer geogrid comprising a homogeneous polyethylene terephthalate substantially uniplanar material having holes or depressions therein that provide highly oriented polyethylene terephthalate strands interconnected by partially oriented junctions forming an array of grid openings, when the substantially uniplanar material is uniaxially or biaxially stretched, said integral polymer geogrid having (a) a tensile strength to weight ratio of from approximately 63N/mm$^2$ to approximately 384N/mm$^2$ and (b) a creep strain at 60% loading which starts out at about 0.75% and does not exceed about 1.00% after 10,000 hours loading.

10. The starting material according to claim 9, wherein the polyethylene terephthalate is crystalline polyethylene terephthalate.

11. The starting material according to claim 9, wherein the substantially uniplanar starting material has an initial thickness of at least 1.4 mm.

12. The starting material according to claim 11, wherein the substantially uniplanar starting material has an initial thickness of at least 3 mm.

13. The starting material according to claim 12, wherein the stretched substantially uniplanar starting material exhibits a substantially linear relationship between a stretch ratio and a specific tensile strength.

14. The starting material according to claim 9, wherein the polyethylene terephthalate has a creep strain at 70% loading which starts out at about 0.75% and does not exceed about 1.50% after 10,000 hours loading.

15. A soil construction comprising a mass of particulate material strengthened by embedding therein a polymer mesh structure as claimed in claim 1.

16. A method of strengthening a mass of particulate material, comprising embedding in the mass of particulate material a polymer mesh structure as claimed in claim 1.

17. A method of making a polymer mesh structure, comprising orienting a substantially uniplanar homogeneous polyethylene terephthalate starting material having holes or depressions therein into an integral geogrid having a plurality of highly oriented[.] polyethylene terephthalate strands interconnected by partially oriented junctions to configure the holes or depressions as mesh openings, said integral geogrid having (a) a tensile strength per unit of cross-sectional area of from approximately 63N/mm$^2$ to approximately 384N/mm$^2$ and (b) a creep strain at 60% loading which starts out at about 0.75% and does not exceed about 1.00% after 10,000 hours loading.

18. The method according to claim 17, wherein the substantially uniplanar polyethylene terephthalate starting material is oriented by uniaxial or biaxial stretching.

19. The method according to claim 17, wherein the polyethylene terephthalate is crystalline polyethylene terephthalate.

20. The method according to claim 19, wherein the substantially uniplanar polyethylene terephthalate starting material has an initial thickness of at least 3 mm.

21. The method according to claim 17, further comprising a step of manipulating a variable associated with the polyethylene terephthalate to improve resistance of the integral [geocrid] *geogrid* to hydrolysis, the variable being selected from the group consisting of carboxyl end group, molecular weight, crystallinity, orientation, surface area, temperature, pH, and cation presence.

22. The method according to claim 17, wherein the polyethylene terephthalate has a creep strain at 70% loading which starts out at about 0.75% and does not exceed about 1.50% after 10,000 hours loading.

23. A method of providing a stabilized soil construction, comprising:

[uniazially] *uniaxially* or biaxially stretching a crystalline polyethylene terephthalate substantially uniplanar starting material having holes or depressions therein to form an integral geogrid having a plurality of highly oriented polyethylene terephthalate strands interconnected by partially oriented junctions which define a plurality of grid openings, said integral polymer geogrid having (a) a tensile strength per unit of cross-sectional area of from approximately 63N/mm$^2$ to approximately 384N/mm$^2$ and (b) a creep strain at 60% loading which starts out at about 0.75% and does not exceed about 1.00% after 10,000 hours loading; and embedding the integral geogrid in a mass of particulate material.

24. The method according to claim 23, wherein the polyethylene terephthalate has a creep strain at 70% loading which starts out at about 0.75% and does not exceed about 1.50% after 10,000 hours loading.

*25. A substantially uniplanar integral geogrid formed by uniaxially or biaxially stretching and orienting a substantially uniplanar sheet-like material having an array of perforations or indentations, said substantially uniplanar integral geogrid comprising:*

*a plurality of interconnected, oriented strands and partially oriented junctions having an array of openings therebetween, with the substantially uniplanar sheet-like material and the substantially uniplanar integral geogrid being made of polyethylene terephthalate.*

*26. The substantially uniplanar integral geogrid according to claim 25, wherein the polyethylene terephthalate substantially uniplanar sheet-like material is biaxially stretched and oriented to form the polyethylene terephthalate substantially uniplanar integral geogrid having molecularly oriented longitudinal strands and molecularly oriented transverse strands interconnected by the partially oriented junctions which define generally square or rectangular grid openings.*

*27. The substantially uniplanar integral geogrid according to claim 25, wherein the polyethylene terephthalate is a homopolymer or a copolymer.*

*28. The substantially uniplanar integral geogrid according to claim 25, wherein the polyethylene terephthalate is selected from the group consisting of amorphous polyethylene terephthalate, crystalline polyethylene terephthalate, and polyethylene terephthalate glycol.*

*29. The substantially uniplanar integral geogrid according to claim 25, wherein the polyethylene terephthalate substantially uniplanar sheet-like material is uniaxially stretched and oriented to form a generally square or rectangular grid of substantially parallel oriented strands and a set of substantially parallel bars generally at right angles to the strands, wherein an end of each of the strands is oriented into adjacent ones of said parallel bars.*

*30. The substantially uniplanar integral geogrid according to claim 25, wherein the polyethylene terephthalate substantially uniplanar sheet-like material has an initial thickness of at least about 1.4 mm.*

*31. The substantially uniplanar integral geogrid according to claim 25, wherein the polyethylene terephthalate strands include substantially transversely oriented strands interconnected by substantially longitudinally oriented strands.*

*32. A starting material for making a substantially uniplanar integral geogrid, said starting material comprising:*

*a substantially uniplanar sheet-like material having holes or depressions therein that provides a plurality of*

*interconnected, oriented strands and partially oriented junctions having an array of openings therebetween when the substantially uniplanar sheet-like material is uniaxially or biaxially stretched, with the substantially uniplanar sheet-like material being made of polyethylene terephthalate.*

*33. The starting material according to claim 32, wherein the stretched polyethylene terephthalate substantially uniplanar sheet-like material exhibits a substantially linear relationship between a stretch ratio and a specific tensile strength.*

*34. A method of making a substantially uniplanar integral geogrid, said method comprising:*

*stretching and orienting a substantially uniplanar sheet-like material having holes or depressions therein to provide a plurality of interconnected, oriented strands and partially oriented junctions, and to configure the holes or depressions as geogrid openings, with the substantially uniplanar sheet-like material and the substantially uniplanar integral geogrid being made of polyethylene terephthalate.*

*35. The method according to claim 34, wherein the polyethylene terephthalate substantially uniplanar sheet-like starting material is oriented by uniaxial or biaxial stretching.*

*36. The method according to claim 34, wherein the polyethylene terephthalate is crystalline polyethylene terephthalate.*

* * * * *